United States Patent [19]

Ishizuka

[11] Patent Number: 4,863,250
[45] Date of Patent: Sep. 5, 1989

[54] F.θ LENS SYSTEM

[76] Inventor: Tazuko Ishizuka, c/o Asahi Kogaku Kogyo Kabushiki Kaisha, No. 36-9, Maenocho 2-chome, Itabashi-ku, Tokyo, Japan

[21] Appl. No.: 176,003

[22] Filed: Mar. 31, 1988

[30] Foreign Application Priority Data

Apr. 3, 1987 [JP] Japan .................................. 62-82713

[51] Int. Cl.⁴ ........................ G02B 13/22; G02B 9/62; G02B 9/64
[52] U.S. Cl. ................................. 350/463; 350/415; 350/464
[58] Field of Search ........................ 350/463, 464, 415

[56] References Cited

U.S. PATENT DOCUMENTS 4,396,254 8/1983 Shibuya .............................. 350/463

Primary Examiner—John K. Corbin
Assistant Examiner—Rebecca D. Gass

[57] ABSTRACT

An f.θ lens system which incorporates the advantages of a telecentric optical system and which is also achromatized so as to permit its use with a multi-mode laser. The lens system includes, in order from the light source side, of a first lens unit composed of one or two lens elements and which has a negative refractive power with a concave surface directed toward the light source side, a second lens unit composed of a positive meniscus lens having a convex surface directed toward the image side, a third lens unit composed of two positive lens elements and one negative lens element and which has a positive refractive power, and a fourth lens unit composed of two plano-convex lens elements and which is spaced a long distance from the third lens unit so as to be located at a position close to the image plane.

13 Claims, 8 Drawing Sheets

F.θ LENS SYSTEM

BACKGROUND OF THE INVENTION

The present invention relates to an f.θ lens system for use in a scanning optics system. More particularly, the present invention relates to an achromatized telecentric f.θ lens system of a four-unit composition.

Various printers, plotters, facsimiles and other equipment that employ a laser beam are known. In the scanning optics of such apparatuses, a laser beam is scanned with constantly a rotating mirror such as a polygonal mirror in such a manner that the angular scanning velocity is proportional to the speed of movement of an image. In such optics, an f.θ lens system is commonly employed that satisfies the relation y=f.θ, in which f denotes the focal length of the lens, θ is the angle at which the beam enters the lens, and y is the height of a real image.

Many f.θ lens systems have been known, but since all are intended to be used with laser light having a single wavelength, compensation for chromatic aberration has not been included in their design considerations.

An achromatic f.θ lens, however, is desirable for compatibility with a laser that operates in more than one longitudinal mode. Such a multi-mode operating laser produces a higher energy-output than a single-mode laser and offers advantages such as a higher imaging speed in laser photoplotters. Therefore, a single-mode laser that produces a certain output power can be replaced by a multi-mode laser of a smaller size. Taking an argon laser operating at a single wavelength λ of 488 nm as an example, approximately three times as high an output can be produced from a multi-mode argon laser operating over a wavelength range of 488 to 514.5 nm.

A telecentric optical system is also known in the art. In this system, the principal ray emanating from an off-axial object point extends at an angle substantially perpendicular to the image plane. A major advantage of a telecentric optical system is that, even if defocusing occurs when the imaging plane is slightly displaced in the direction of the optical axis or on account of the presence of corrugation in the imaging surface, a predetermined relationship between the angle of incidence and the height of the image is retained to ensure a comparatively high dimensional accuracy. Telecentric f.θ lens systems of the above type have been proposed, for example, in Unexamined Published Japanese patent application No. 195211/1984.

SUMMARY OF THE INVENTION

The present invention has been accomplished under the circumstances described above, and an object thereof is to provide a telecentric f.θ lens system which is not only designed to incorporate the advantages of a telecentric optical system but is also achromatized (compensated for chromatic aberration) so as to permit the use of a multi-mode laser.

In accordance with the above and other objects, the invention provides an f.θ lens system comprising, in order from the light source side, a first lens unit made up of one or two lens elements and which has a negative refractive power with a concave surface directed toward the light source side, a second lens unit made of a positive meniscus lens having a convex surface directed toward the image side, a third lens unit made up of two positive lens elements and one negative lens element and which has a positive refractive power, and a fourth lens unit made up of one or two plano-convex lens elements and which is spaced a long distance from said third lens unit to be located at a position close to an image plane, said lens system further satisfying the following conditions:

$$0.2 < |f_I|/f < 0.5 (f_I < 0) \quad (1)$$

$$0.30 < f_{III}/f < 0.95 \quad (2)$$

$$0.65 < \frac{d_{III\,IV}}{f} < 1.4 \quad (3)$$

$$1.25 < f_{IV}/f < 3.0 \quad (4)$$

$$\nu_{II} > 50 \quad (5)$$

$$\frac{\nu_{III\,P1} + \nu_{III\,P2}}{2} - \nu_{III\,N} > 20 \quad (6)$$

$$0.85 < \frac{f_{II\,III}}{f_I} < 1.15 \quad (7)$$

where
- f: focal length of the overall system
- $f_I$: focal length of the first lens unit
- $f_{III}$: focal length of the third lens unit
- $d_{III\,IV}$: distance between the third and fourth lens units
- $f_{IV}$: focal length of the fourth lens unit
- $\nu_{II}$: Abbe number of the second lens unit
- $\nu_{III\,P1}$: Abbe number of the positive lens element in the third lens unit that is situated on the light source side
- $\nu_{III\,P2}$: Abbe number of the positive lens element in the third lens unit that is situated on the image side
- $\nu_{III\,N}$: Abbe number of the negative lens element in the third lens unit
- $f_{II\,III}$: composite focal length of the second and third lens units.

Figure 1:
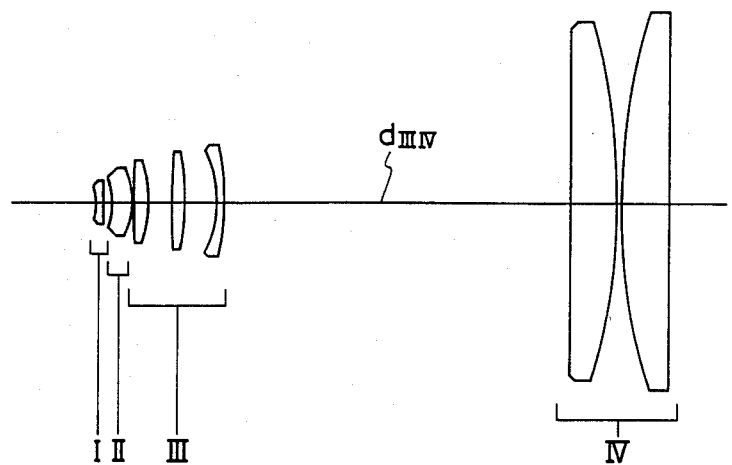
FIGS. 1, 3, 5, 7, 9, 11, 13 and 15 are simplified cross-sectional views of lens systems constructed in accordance with Examples 1-8, respectively, herein.
Figure 2:
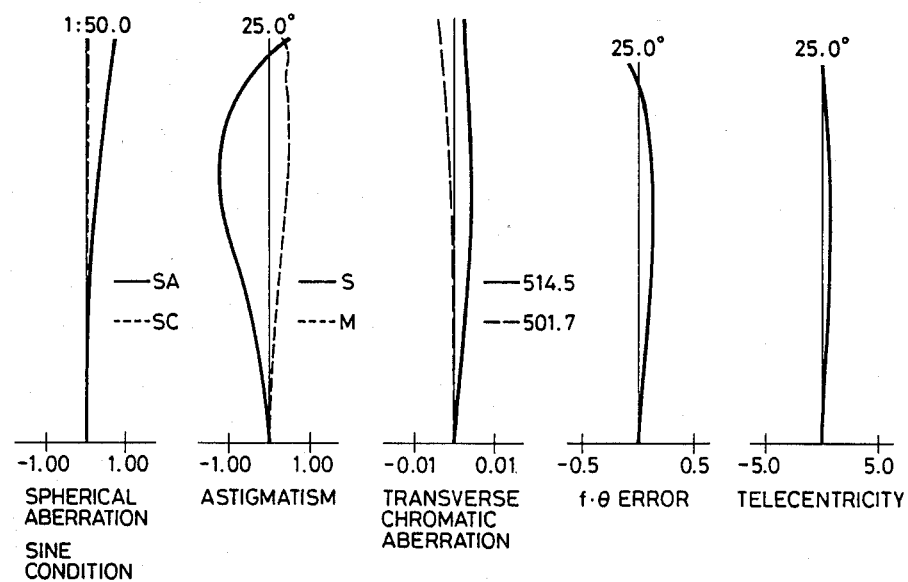
FIGS. 2, 4, 6, 8, 10, 12, 14 and 16 are graphs plotting the aberration curves obtained with the lens systems of Examples 1-8, respectively.
Figure 3:
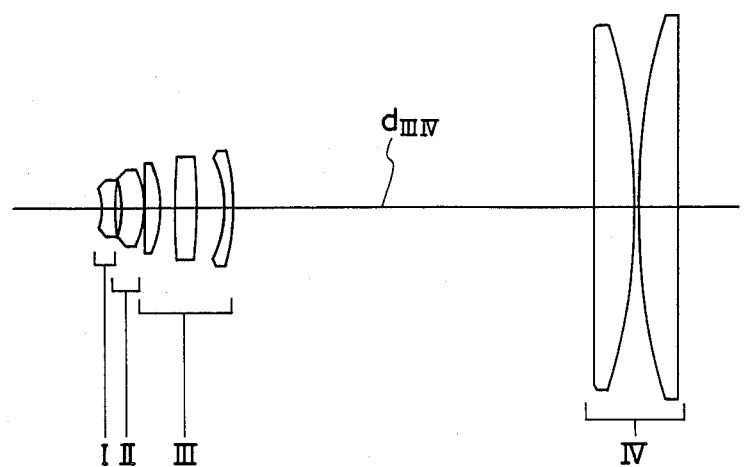
Figure 4:
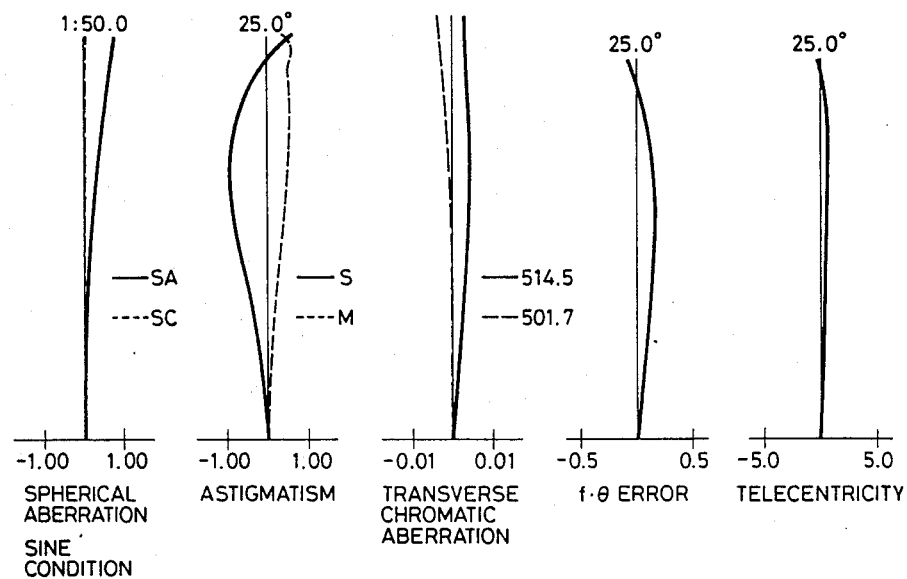
Figure 5:
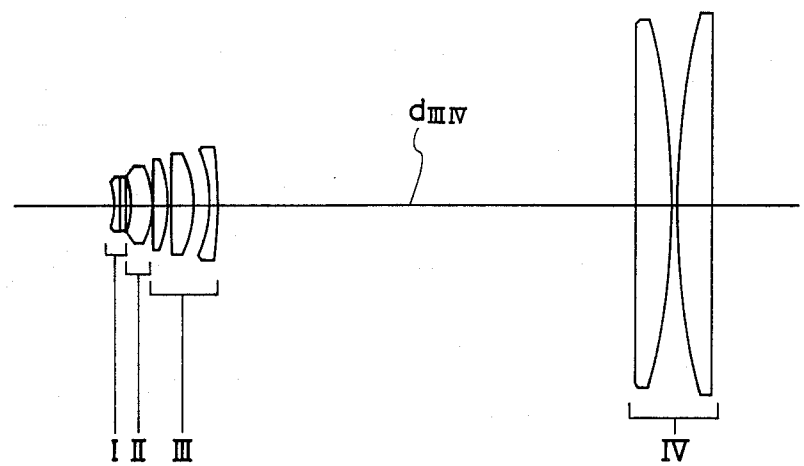
Figure 6:
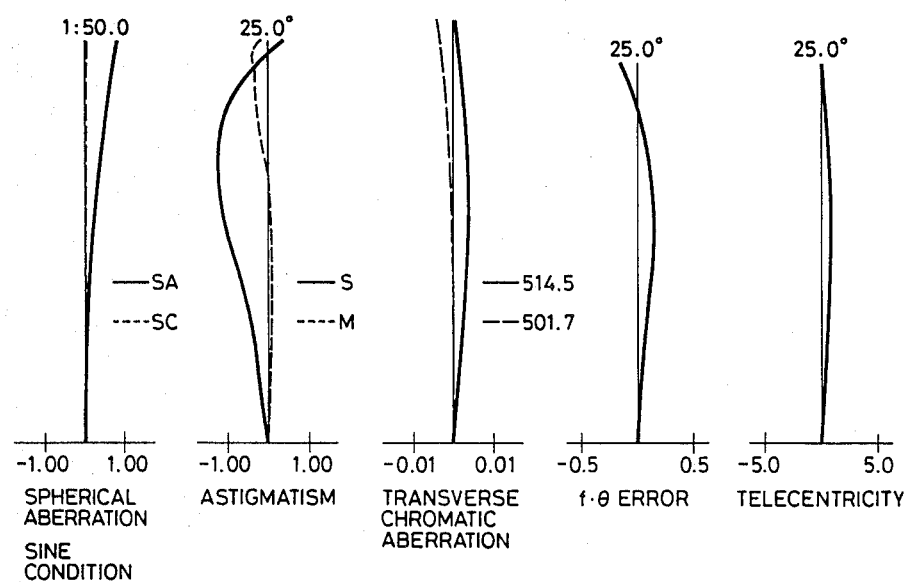
Figure 7:
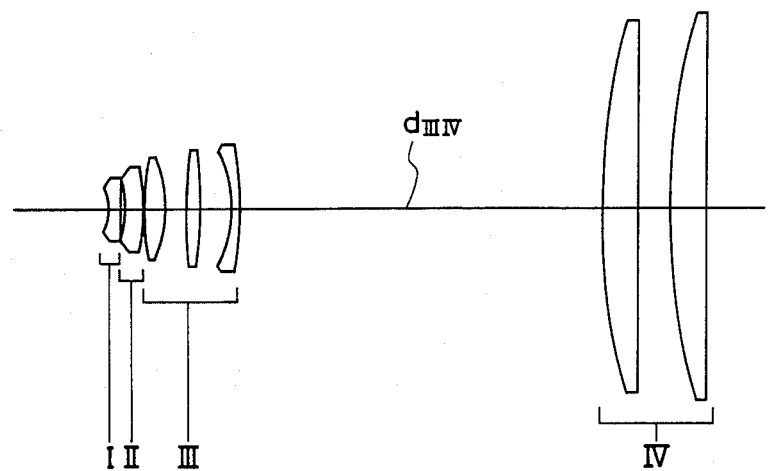
Figure 8:
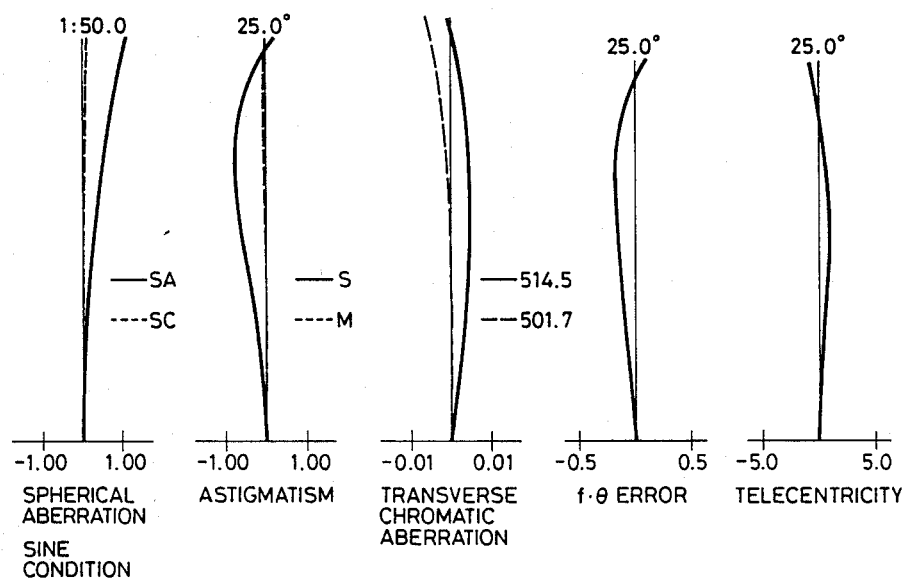
Figure 9:
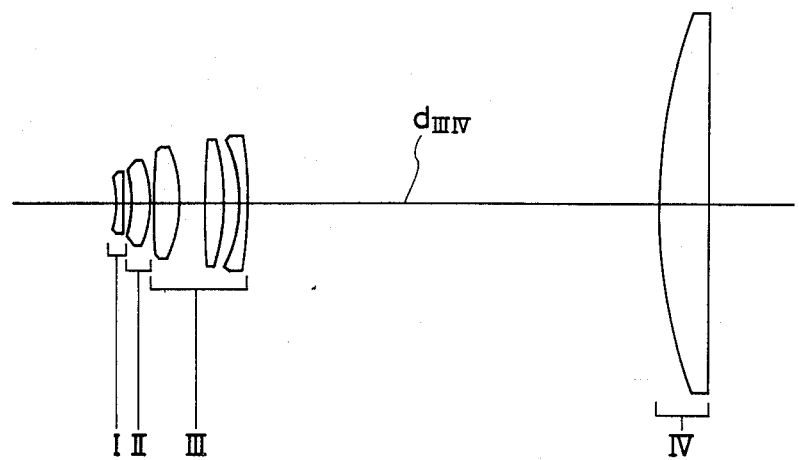
Figure 10:
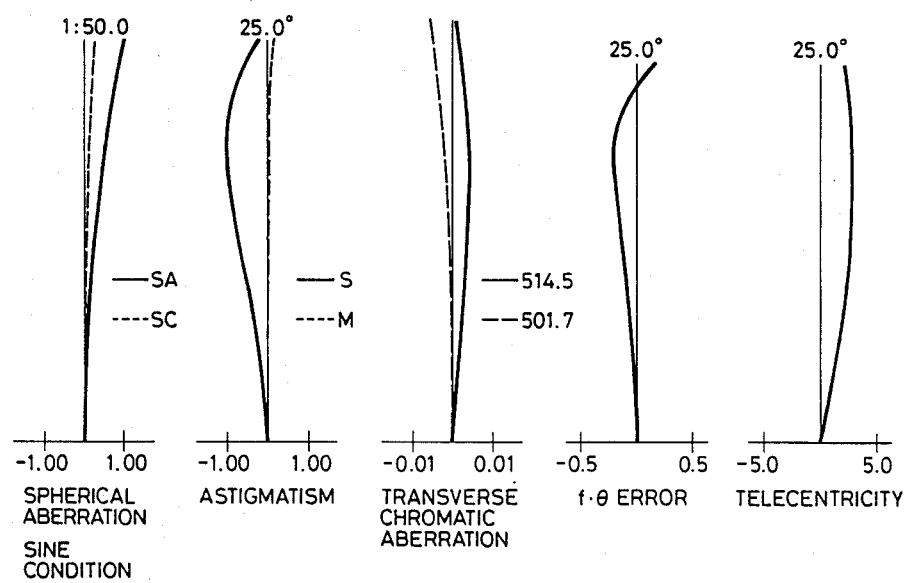
Figure 11:
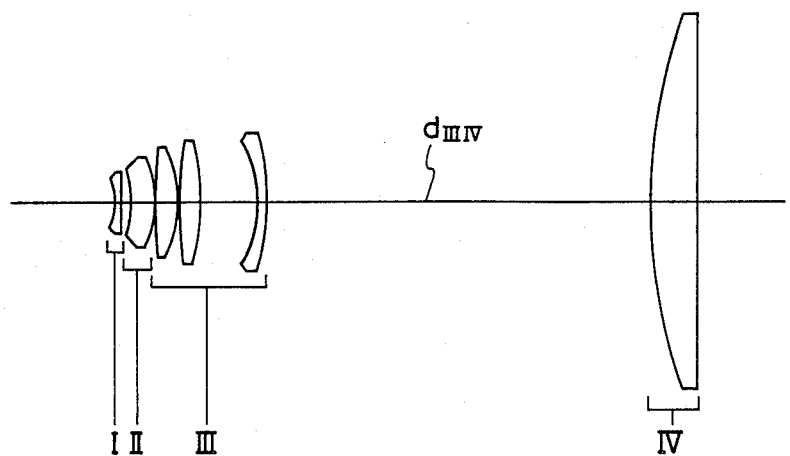
Figure 12:
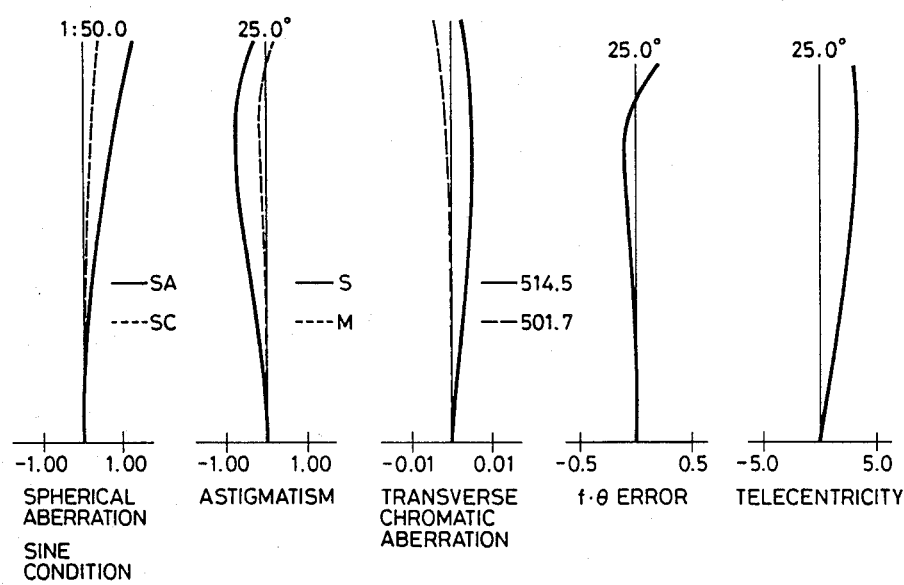
Figure 13:
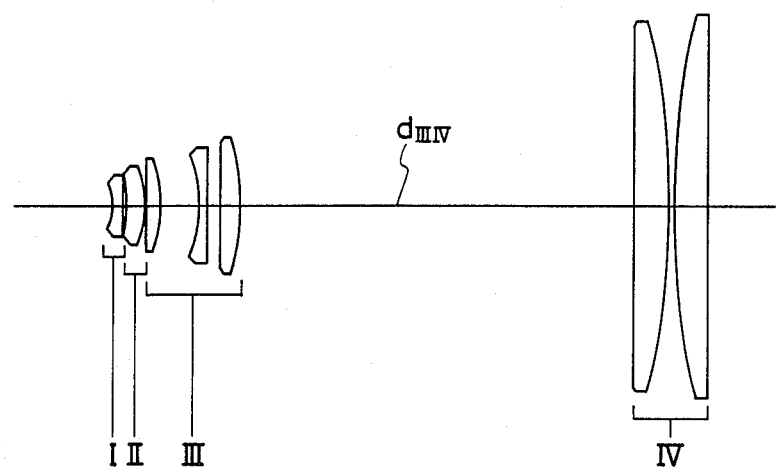
Figure 14:
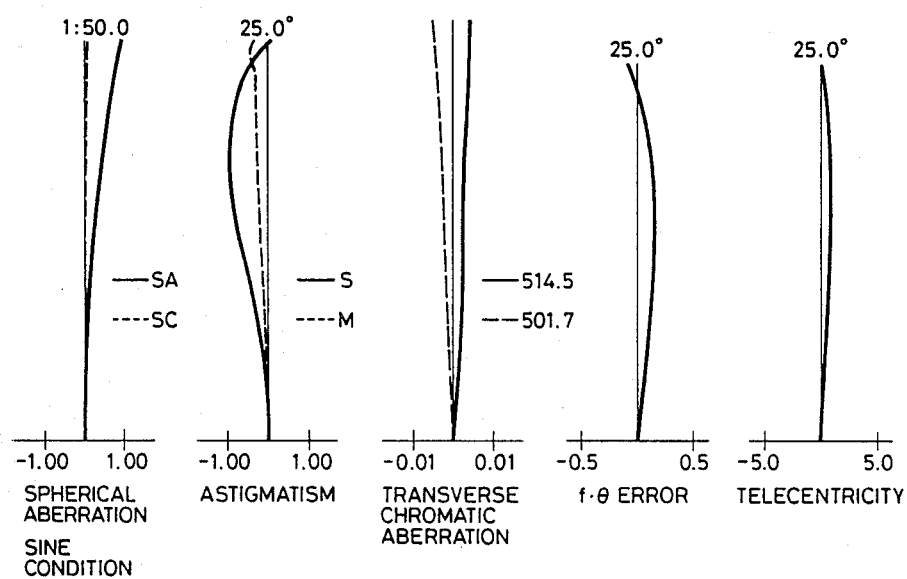
Figure 15:
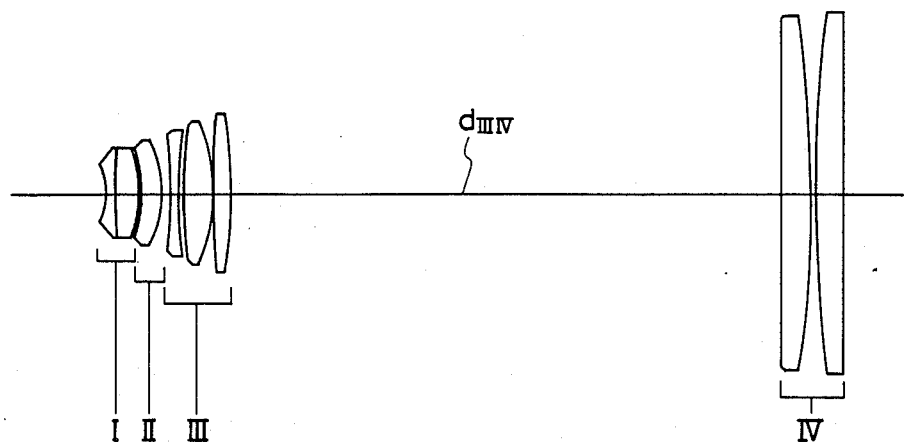
Figure 16:
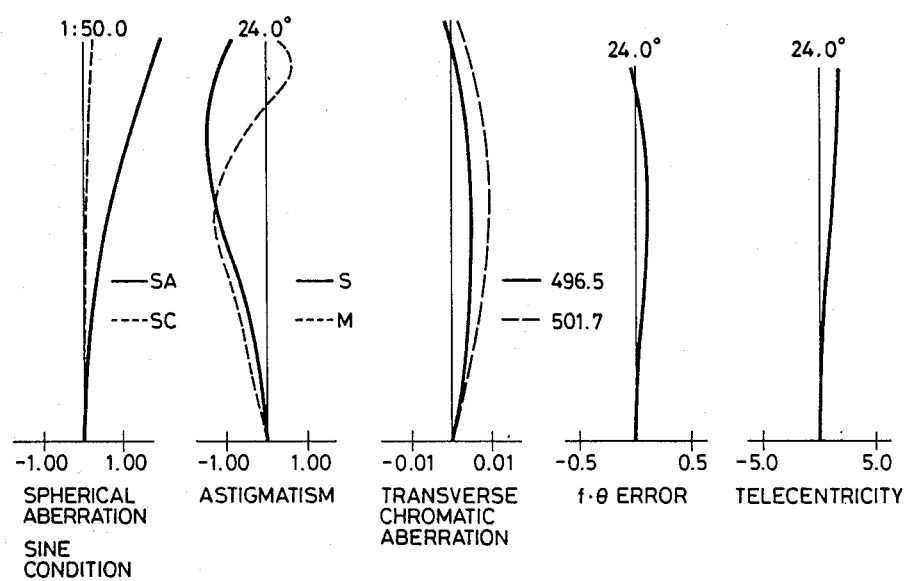

In the drawings:
I: first lens unit; II: second lens unit; III: third lens unit; IV: fourth lens unit; $d_{III\,IV}$: distance between the third and fourth lens units;

f.θ error: difference (in mm) between the height of a real image and that of an ideal image;

telecentricity: deviation of the angle (in degrees) of incident light on an imaging plane from the optical axis, with 0° deviation for the light that is incident perpendicular to the imaging plane, or incident light parallel to the optical axis.

DESCRIPTION OF THE PREFERRED EMBODIMENTS

An f.θ lens system which has an entrance pupil located in its front theoretically reqirues that the overall composition provide a negative and a positive power in order from the object side. In the system of the present invention, a negative power is provided by the first lens unit and a positive power by the second to fourth units.

Structually, the f.θ lens system of the present invention is divided into a front group (the first to third units) and a rear group (the fourth lens unit). The principal functions of an f.θ lens system, namely, the f.θ property and compensation for spherical aberration, coma, chromatic aberration, astigmatism and field curvature, are chiefly achieved by the front group. The fourth lens unit forming the rear group is located close to the image plane and is chiefly responsible for affording telecentricity by serving as a condenser lens.

The first to third units forming the front group are composed of negative, positive and positive units, respectively. In the front group, aberration occurring in the first lens unit are compensated by the second and third lens units.

An f.θ lens system is designed so that the image height y of a real image satisifies the relation $y \approx f \cdot \theta$. In order to impart the f.θ property, negative distortion must be deliberately introduced. To this end, the system of the present invention employs a positive lens in each of the second and third units so as to create the required negative distortion.

However, the use of such positive lens units unavoidably increases the Petzval sum, that is, impairs the flatness of the image. The first lens unit has a negative power and serves to cancel the increase in the Petzval sum.

As already mentioned, in order for the system of the present invention to attain the desired f.θ property, negative distortion is created by the positive lenses in the second and third units. In order to produce a greater degree of negative distortion, the refractive power of positive lense (particularly those in the third unit) has to be increased. However, there is a limit on the extent to which the refractive power of positive lenses can be increased because, for a given optical material, the increase in the refractive power of a positive lens also causes an increase in Petzval sum. In order to reduce the Petzval sum, the composite a refractive index of the third lens unit may be increased (that is, the refractive indices of the positive lenses are increased while that of the negative lens is decreased), but this is limited by the condition for achromatization set forth in inequality (6). To deal with this problem, the second unit is composed of a positive meniscus lens to compensate for field curvature and astigmatism.

The third lens unit is composed of three lens elements, one of which is a negative lens responsible for achromatization. Enhanced achromatization is possible by forming the first lens unit of a cemented or compound lens.

The fourth lens unit is composed of one or two plano-convex lens elements. A two-element composition has the advantage that it allows for a smaller lens curvature than a single-element composition, thus affording greater convenience in aberrational compensation. That is, first of all, a greater latitude is allowed for increasing the composite power of the fourth lens unit. This enables the distance between the third and fourth lens units ($d_{III-IV}$) to be sufficiently reduced to facilitate compensation for chromatic aberration. In addition, the ease of power distribution contributes to an improvement of telecentricity. In an arrangement where two planes are directed toward respective light source side and the image side, the fourth unit will have almost negligible effects on distortion and other aberrations, and hence particular advantages are attained in that various aberrations can be easily compensated and that the physical size of the front group can be reduced. The fourth lens unit, which is located near the image plane, unavoidably require a large lens size if the image plane is also large. However, in scanning optics, the fourth lens unit extends only uniaxially along radii including the central point, and thus the lens shape may be elongated in the scanning direction and need not be circular. Furthermore, the fourth lens unit does not require as close tolerances for machining or assembly operations as the first to third units making up the front group. Therefore, use of an elongated lens (i.e., sliced lens) in the fourth unit will provide a particularly great convenience in practice.

The criticality of each of conditions (1) to (7) is described hereinafter.

Condition (1) determines the power of the first lens unit. If $|f_I|$ is increased to such an extent that the upper limit of condition (1) is exceeded, the negative power of the first lens unit will be decreased and the Petzval sum increased, which is detrimental to the desired flatness of the image plane. If $|f_I|$ is decreased to such an extent that the lower limit of condition (1) is not reached, the negative power of the first lens unit will be increased. In the system of the present invention, the aberrations that occur in the first lens unit are chiefly compensated for by the second and third lens units, and thus it becomes difficult to achieve proper compensation for coma, spherical aberration and astigmatism.

Condition (2) determines the power of the third lens unit and is necessary to achieve effective compensation of the aberrations (i.e., coma, spherical aberration, and astigmatism) that might otherwise occur in the first lens unit. If the lower limit of condition (2) is not reached, the power of the third lens unit will become so strong that a large amount of negative distortion will be introduced, not only impairing the f.θ property of the overall system but also to making it impossible to achieve proper compensation for other aberrations. If the upper limit of condition (2) is exceeded, the power of the third lens unit will be reduced and the power of the second lens unit must be increased correspondingly, but then effective compensation for distortion and other aberrations become difficult to accomplish.

Conditions (3) and (4) have to be satisfied simultaneously in order to retain telecentricity.

Condition (3) sets forth the requirement that should be met by the distance between the front group and the rear group. If the lower limit of this condition is not reached, it becomes difficult to realize telecentricity. If the upper limit of condition (3) is exceeded, it becomes difficult to compensate for chromatic aberration, in particular, lateral chromatic aberration. This may be explained as follows. The fourth lens unit is composed solely of positive lens elements and hence is unable to compensate for chromatic aberration. To deal with this situation, any chromatic aberration that may occur in the fourth lens unit must be precompensated in the third lens unit. Therefore, if the distance between the front group and the rear group is increased, namely, if the upper limit of condition (3) is exceeded, inconvenience will be introduced in compensating for chromatic aberration.

Condition (4) sets fourth the requirement that should be met by the power of the fourth lens unit. If $f_{IV}$ is decreased to such an extent that the lower limit of condition (4) is not reached, the power of the fourth lens unit becomes excessive and $d_{III-IV}$ is too short to ensure easy accomplishment of telecentricity. If $f_{IV}$ is increased to such an extent that the upper limit of condition (4) is exceeded, $d_{III-IV}$ is increased, whereupon not only does it become difficult to compensate for chromatic aberration but also the fourth lens unit becomes less effective in contributing to the realization of telecentricity.

Conditions (5) and (6) are necessary for achieving compensation of chromatic aberration. The f.θ lens system of the present invention largely depends on the third lens unit for effective compensation for chromatic aberration. As already mentioned, the fourth lens unit, which is composed solely of positive lens elements, has no ability to compensate for chromatic aberration, and hence the chromatic aberration that may occur in the fourth lens unit must be precompensated by the third lens unit. If conditions (5) and (6) are not satisfied, it becomes difficult to compensate for chromatic aberration, notably lateral chromatic aberration. It should also be noted that if the positive lens in the second unit is formed of a highly dispersive optical material (i.e., if condition (5) is not met), the third lens unit is no longer capable of effective compensation for chromatic aberration. For the purpose of effective compensation of lateral chromatic aberration, the negative lens in the third unit is advantageously positioned at the rearmost end (i.e., on the side of the image plane).

Condition (7) is necessary to maintain an appropriate amount of negative distortion. As already mentioned, the system of the present invention is an f.θ lens and requires a negative distortion to be produced. To this end, a positive distortion is produced in the first lens unit and a negative distortion is created in the second and third lens units. If the upper limit of condition (7) is exceeded, the negative distortion produced in the second and third lens units becomes excessive. If the lower limit of condition (7) is not reached, the positive distortion produced in the first lens unit becomes excessive. In either case, the overall lens system will not provide the desired f.θ property.

EXAMPLES

Examples 1 to 8 of the present invention are described in the data tables below, in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

Example 1

$F_{NO} = 1:50.0 \quad f = 750.68$
Entrance pupil located ahead of the first surface 60.54

| Surface No. | r | d | N | ν |
|---|---|---|---|---|
| 1 | −109.779 | 12.87 | 1.61405 | 55.0 |
| 2 | −708.195 | 10.11 | | |
| 3 | −297.934 | 37.43 | 1.48749 | 70.2 |
| 4 | −171.096 | 4.36 | | |
| 5 | 1454.764 | 27.87 | 1.69680 | 55.5 |
| 6 | −206.712 | 39.87 | | |
| 7 | 1288.277 | 21.46 | 1.48749 | 70.2 |
| 8 | −754.370 | 57.19 | | |
| 9 | −209.172 | 13.00 | 1.74000 | 28.3 |
| 10 | −580.912 | 618.41 | | |
| 11 | ∞ | 84.79 | 1.51633 | 64.1 |
| 12 | −1086.565 | 8.00 | | |
| 13 | 1086.565 | 84.79 | 1.51633 | 64.1 |
| 14 | ∞ | | | |

(1) $|f_I|/f = 0.28$
(2) $f_{III}/f = 0.38$
(3) $d_{III\ IV}/f = 0.82$
(4) $f_{IV}/f = 1.39$
(5) $\nu_{II} = 70.2$
(6) $\dfrac{\nu_{III\ P1} + \nu_{III\ P2}}{2} - \nu_{III\ N} = 34.6$
(7) $\dfrac{f_{II\ III}}{f_1} = 0.92$

Example 2

$F_{NO} = 1:50.0 \quad f = 750.70$
Entrance pupil located ahead of the first surface 64.98

| Surface No. | r | d | N | ν |
|---|---|---|---|---|
| 1 | −110.000 | 26.03 | 1.51454 | 54.7 |
| 2 | −937.216 | 7.54 | | |
| 3 | −323.053 | 38.00 | 1.48749 | 70.2 |
| 4 | −191.602 | 1.00 | | |
| 5 | 1120.729 | 30.98 | 1.64850 | 53.0 |
| 6 | −204.127 | 27.63 | | |
| 7 | 2032.027 | 38.00 | 1.69680 | 55.5 |
| 8 | −1505.848 | 50.89 | | |
| 9 | −202.801 | 13.00 | 1.80518 | 25.4 |
| 10 | −442.114 | 640.44 | | |
| 11 | ∞ | 71.04 | 1.51633 | 64.1 |
| 12 | −1113.820 | 8.00 | | |
| 13 | 1113.820 | 71.04 | 1.51633 | 64.1 |
| 14 | ∞ | | | |

(1) $|f_I|/f = 0.32$
(2) $f_{III}/f = 0.42$
(3) $d_{III\ IV}/f = 0.85$
(4) $f_{IV}/f = 1.42$
(5) $\nu_{II} = 70.2$
(6) $\dfrac{\nu_{III\ P1} + \nu_{III\ P2}}{2} - \nu_{III\ N} = 28.8$
(7) $\dfrac{f_{II\ III}}{f_1} = 0.90$

Example 3

$F_{NO} = 1:50.0 \quad f = 750.65$
Entrance pupil located ahead of the first surface 77.00

| Surface No. | r | d | N | ν |
|---|---|---|---|---|
| 1 | −118.298 | 10.00 | 1.58913 | 61.0 |
| 2 | 1807.895 | 8.11 | 1.68893 | 31.1 |
| 3 | −893.566 | 9.62 | | |
| 4 | −232.653 | 38.45 | 1.49700 | 81.6 |
| 5 | −175.708 | 1.00 | | |
| 6 | 5316.991 | 26.04 | 1.77250 | 49.6 |
| 7 | −267.213 | 7.12 | | |
| 8 | 2922.684 | 39.84 | 1.49700 | 81.6 |
| 9 | −228.526 | 31.42 | | |
| 10 | −206.286 | 13.00 | 1.74000 | 28.3 |
| 11 | −730.225 | 738.62 | | |
| 12 | ∞ | 62.97 | 1.51633 | 64.1 |
| 13 | −1227.262 | 8.00 | | |
| 14 | 1227.262 | 62.97 | 1.51633 | 64.1 |
| 15 | ∞ | | | |

(1) $|f_I|/f = 0.32$
(2) $f_{III}/f = 0.41$
(3) $d_{III\ IV}/f = 0.98$
(4) $f_{IV}/f = 1.57$
(5) $\nu_{II} = 81.6$
(6) $\dfrac{\nu_{III\ P1} + \nu_{III\ P2}}{2} - \nu_{III\ N} = 37.3$ -continued $F_{NO} = 1:50.0$    $f = 750.65$
Entrance pupil located ahead of the first surface 77.00

| Surface No. | r | d | N | ν |
|---|---|---|---|---|
| (7) | $\frac{f_{II\,III}}{f_I} = 0.96$ | | | |

Example 4

$F_{NO} = 1:50.0$    $f = 749.35$
Entrance pupil located ahead of the first surface 78.46

| Surface No. | r | d | N | ν |
|---|---|---|---|---|
| 1 | −111.215 | 21.59 | 1.63854 | 55.4 |
| 2 | −690.464 | 8.25 | | |
| 3 | −290.180 | 38.00 | 1.48749 | 70.2 |
| 4 | −180.385 | 1.00 | | |
| 5 | 1321.400 | 34.22 | 1.69680 | 55.5 |
| 6 | −217.968 | 37.82 | | |
| 7 | 1103.738 | 26.95 | 1.48749 | 70.2 |
| 8 | −608.753 | 55.80 | | |
| 9 | −218.895 | 13.00 | 1.74000 | 28.3 |
| 10 | −617.952 | 636.49 | | |
| 11 | 1182.039 | 65.96 | 1.51633 | 64.1 |
| 12 | ∞ | 56.18 | | |
| 13 | 1182.039 | 65.96 | 1.51633 | 64.1 |
| 14 | ∞ | | | |

(1) $|f_I|/f = 0.28$
(2) $f_{III}/f = 0.37$
(3) $d_{III\,IV}/f = 0.85$
(4) $f_{IV}/f = 1.55$
(5) $\nu_{II} = 70.2$
(6) $\frac{\nu_{III\,P1} + \nu_{III\,P2}}{2} - \nu_{III\,N} = 34.5$
(7) $\frac{f_{II\,III}}{f_I} = 0.96$

Example 5

$F_{NO} = 1:50.0$    $f = 749.92$
Entrance pupil located ahead of the first surface 85.00

| Surface No. | r | d | N | ν |
|---|---|---|---|---|
| 1 | −118.307 | 12.20 | 1.63854 | 55.4 |
| 2 | −758.972 | 12.83 | | |
| 3 | −267.384 | 34.29 | 1.48749 | 70.2 |
| 4 | −184.928 | 6.53 | | |
| 5 | 1246.961 | 48.52 | 1.69680 | 55.5 |
| 6 | −219.951 | 44.16 | | |
| 7 | 1221.674 | 31.57 | 1.48749 | 70.2 |
| 8 | −519.997 | 31.41 | | |
| 9 | −226.019 | 14.00 | 1.74000 | 28.3 |
| 10 | −568.064 | 728.50 | | |
| 11 | 875.046 | 89.82 | 1.51633 | 64.1 |
| 12 | ∞ | | | |

(1) $|f_I|/f = 0.29$
(2) $f_{III}/f = 0.38$
(3) $d_{III\,IV}/f = 0.97$
(4) $f_{IV}/f = 2.24$
(5) $\nu_{II} = 70.2$
(6) $\frac{\nu_{III\,P1} + \nu_{III\,P2}}{2} - \nu_{III\,N} = 34.5$
(7) $\frac{f_{II\,III}}{f_I} = 0.99$

Example 6

$F_{NO} = 1:50.0$    $f = 750.33$
Entrance pupil located ahead of the first surface 85.00

| Surface No. | r | d | N | ν |
|---|---|---|---|---|
| 1 | −110.000 | 12.00 | 1.62299 | 58.2 |
| 2 | −715.309 | 13.93 | | |
| 3 | −290.131 | 42.00 | 1.58913 | 61.0 |
| 4 | −195.187 | 2.01 | | |
| 5 | 1401.966 | 39.76 | 1.48749 | 70.2 |
| 6 | −216.558 | 6.23 | | |
| 7 | 1302.920 | 37.52 | 1.48749 | 70.2 |
| 8 | −340.807 | 100.58 | | |
| 9 | −227.177 | 14.00 | 1.74000 | 28.3 |
| 10 | −445.519 | 680.36 | | |
| 11 | 914.474 | 85.70 | 1.51633 | 64.1 |
| 12 | ∞ | | | |

(1) $|f_I|/f = 0.28$
(2) $f_{III}/f = 0.38$
(3) $d_{III\,IV}/f = 0.91$
(4) $f_{IV}/f = 2.34$
(5) $\nu_{II} = 61.0$
(6) $\frac{\nu_{III\,P1} + \nu_{III\,P2}}{2} - \nu_{III\,N} = 41.9$
(7) $\frac{f_{II\,III}}{f_I} = 0.99$

Example 7

$F_{NO} = 1:50.0$    $f = 750.70$
Entrance pupil located ahead of the first surface 78.95

| Surface No. | r | d | N | ν |
|---|---|---|---|---|
| 1 | −108.692 | 19.20 | 1.50977 | 62.1 |
| 2 | −3306.621 | 6.80 | | |
| 3 | −601.838 | 33.47 | 1.48749 | 70.2 |
| 4 | −172.232 | 2.00 | | |
| 5 | 3551.572 | 27.79 | 1.80440 | 39.6 |
| 6 | −226.013 | 70.98 | | |
| 7 | −220.019 | 12.00 | 1.80518 | 25.4 |
| 8 | −5930.015 | 26.78 | | |
| 9 | −5458.181 | 34.36 | 1.72916 | 54.7 |
| 10 | −364.192 | 695.12 | | |
| 11 | ∞ | 60.90 | 1.51633 | 64.1 |
| 12 | −1279.349 | 8.00 | | |
| 13 | 1279.349 | 60.90 | 1.51633 | 64.1 |
| 14 | ∞ | | | |

(1) $|f_I|/f = 0.29$
(2) $f_{III}/f = 0.54$
(3) $d_{III\,IV}/f = 0.93$
(4) $f_{IV}/f = 1.64$
(5) $\nu_{II} = 70.2$
(6) $\frac{\nu_{III\,P1} + \nu_{III\,P2}}{2} - \nu_{III\,N} = 21.7$
(7) $\frac{f_{II\,III}}{f_I} = 1.01$

Example 8

$F_{NO} = 1:50.0$    $f = 750.51$
Entrance pupil located ahead of the first surface 108.00

| Surface No. | r | d | N | ν |
|---|---|---|---|---|
| 1 | −104.848 | 18.01 | 1.51112 | 60.5 |
| 2 | 1227.930 | 38.00 | 1.72342 | 38.0 |
| 3 | −495.112 | 4.55 | | |
| 4 | −568.344 | 40.00 | 1.48749 | 70.2 |
| 5 | −195.633 | 17.17 | | |
| 6 | −953.790 | 13.00 | 1.80518 | 25.4 |
| 7 | 777.368 | 10.59 | | |
| 8 | 948.224 | 51.19 | 1.48749 | 70.2 |

-continued

| $F_{NO} = 1:50.0$ $f = 750.51$ Entrance pupil located ahead of the first surface 108.00 | | | | |
|---|---|---|---|---|
| Surface No. | r | d | N | ν |
| 9 | −337.320 | 1.50 | | |
| 10 | 2331.561 | 33.29 | 1.69680 | 55.5 |
| 11 | −752.800 | 978.03 | | |
| 12 | ∞ | 50.00 | 1.51633 | 64.1 |
| 13 | −2269.202 | 8.00 | | |
| 14 | 2269.202 | 50.00 | 1.51633 | 64.1 |
| 15 | ∞ | | | |
| (1) | $\|f_I\|/f = 0.44$ | | | |
| (2) | $f_{III}/f = 0.90$ | | | |
| (3) | $d_{III\,IV}/f = 1.30$ | | | |
| (4) | $f_{IV}/f = 2.90$ | | | |
| (5) | $\nu_{II} = 70.2$ | | | |
| (6) | $\dfrac{\nu_{III\,P1} + \nu_{III\,P2}}{2} - \nu_{III\,N} = 37.4$ | | | |
| (7) | $\dfrac{f_{II\,III}}{f_I} = 1.03$ | | | |

As described above, the present invention provides an f.θ lens of a four-unit composition satisfying conditions (1) to (7). This lens system is achromatic and adapted to the use of a multi-mode laser operating at more than one wavelength. The lens systems is also telecentric and ensures high dimensional precision on the imaging plane. Furthermore, the f.θ lens system of the present invention permits effective compensation for various aberrations.

What is claimed is:

1. An f.θ lens system comprising, in order from a light source side: a first lens unit comprises no more than two lens elements and which has a negative refractive power with a concave surface directed toward the light source side, a second lens unit comprising a positive meniscus lens having a convex surface directed toward the image side, a third lens unit comprising two positive lens elements and one negative lens element and which has a positive refractive power, and a fourth lens unit comprising no more than two plano-convex lens elements and which is spaced along distance from said third lens unit to be located at a position close to an image plane, said lens system further satisfying the following conditions:

$$0.2 < |f_I|/f < 0.5 \quad (f_I < 0) \qquad (1)$$

$$0.30 < f_{III}/f < 0.95 \qquad (2)$$

$$0.65 < \frac{d_{III\,IV}}{f} < 1.4 \qquad (3)$$

$$1.25 < f_{IV}/f < 3.0 \qquad (4)$$

$$\nu_{II} > 50 \qquad (5)$$

$$\frac{\nu_{III\,P1} + \nu_{III\,P2}}{2} - \nu_{III\,N} > 20 \qquad (6)$$

$$0.85 < \frac{f_{II\,III}}{f_I} < 1.15 \qquad (7)$$

where
f: focal length of the overall system
$f_I$: focal length of the first lens unit
$f_{III}$: focal length of the third lens unit
$d_{III\,IV}$: distance between the third and fourth lens units
$f_{IV}$: focal length of the fourth lens unit
$\nu_{II}$: Abbe number of the second lens unit
$\nu_{III\,P1}$: Abbe number of a one, situated on the light source side, of said positive lens elements in the third lens unit
$\nu_{III\,P2}$: Abbe number of a one, situated on the image side, of said positive lens elements in the third lens unit
$\nu_{III\,N}$: Abbe number of the negative lens element in the third lens unit
$f_{II\,III}$: composite focal length of the second and third lens units.

2. The f.θ lens system of claim 1, wherein said first lens unit comprises a single lens element.

3. The f.θ lens system of claim 1, wherein said first lens unit comprises two lens elements.

4. The f.θ lens system of claim 1, wherein said fourth lens unit comprises a single lens element.

5. The f.θ lens system of claim 1, wherein said fourth lens unit comprises two lens elements.

6. The f.θ lens system of claim 1, further satisfying the following charts:

| $F_{NO} = 1:50.0$ $f = 750.68$ Entrance pupil located ahead of the first surface 60.54 | | | | |
|---|---|---|---|---|
| Surface No. | r | d | N | ν |
| 1 | −109.779 | 12.87 | 1.61405 | 55.0 |
| 2 | −708.195 | 10.11 | | |
| 3 | −297.934 | 37.43 | 1.48749 | 70.2 |
| 4 | −171.096 | 4.36 | | |
| 5 | 1454.764 | 27.87 | 1.69680 | 55.5 |
| 6 | −206.712 | 39.87 | | |
| 7 | 1288.277 | 21.46 | 1.48749 | 70.2 |
| 8 | −754.370 | 57.19 | | |
| 9 | −209.172 | 13.00 | 1.74000 | 28.3 |
| 10 | −580.912 | 618.41 | | |
| 11 | ∞ | 84.79 | 1.51633 | 64.1 |
| 12 | −1086.565 | 8.00 | | |
| 13 | 1086.565 | 84.79 | 1.51633 | 64.1 |
| 14 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

7. The f.θ lens system of claim 1, further satisfying the following charts:

| $F_{NO} = 1:50.0$ $f = 750.70$ Entrance pupil located ahead of the first surface 64.98 | | | | |
|---|---|---|---|---|
| Surface No. | r | d | N | ν |
| 1 | −110.000 | 26.03 | 1.51454 | 54.7 |
| 2 | −937.216 | 7.54 | | |
| 3 | −323.053 | 38.00 | 1.48749 | 70.2 |
| 4 | −191.602 | 1.00 | | |
| 5 | 1120.729 | 30.98 | 1.64850 | 53.0 |
| 6 | −204.127 | 27.63 | | |
| 7 | 2032.027 | 38.00 | 1.69680 | 55.5 |
| 8 | −1505.848 | 50.89 | | |
| 9 | −202.801 | 13.00 | 1.80518 | 25.4 |
| 10 | −442.114 | 640.44 | | |
| 11 | ∞ | 71.04 | 1.51633 | 64.1 |
| 12 | −1113.820 | 8.00 | | |
| 13 | 1113.820 | 71.04 | 1.51633 | 64.1 |
| 14 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

8. The f.θ lens system of claim 1, further satisfying the following charts:

| $F_{NO} = 1:50.0$  f = 750.65 Entrance pupil located ahead of the first surface 77.00 | | | | |
|---|---|---|---|---|
| Surface No. | r | d | N | ν |
| 1 | −118.298 | 10.00 | 1.58913 | 61.0 |
| 2 | 1807.895 | 8.11 | 1.68893 | 31.1 |
| 3 | −893.566 | 9.62 | | |
| 4 | −232.653 | 38.45 | 1.49700 | 81.6 |
| 5 | −175.708 | 1.00 | | |
| 6 | 5316.991 | 26.04 | 1.77250 | 49.6 |
| 7 | −267.213 | 7.12 | | |
| 8 | 2922.684 | 39.84 | 1.49700 | 81.6 |
| 9 | −228.526 | 31.42 | | |
| 10 | −206.286 | 13.00 | 1.74000 | 28.3 |
| 11 | −730.225 | 738.62 | | |
| 12 | ∞ | 62.97 | 1.51633 | 64.1 |
| 13 | −1227.262 | 8.00 | | |
| 14 | 1227.262 | 62.97 | 1.51633 | 64.1 |
| 15 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

9. The f.θ lens system of claim 1, further satisfying the following charts:

| $F_{NO} = 50.0$  f = 749.35 Entrance pupil located ahead of the first surface 78.46 | | | | |
|---|---|---|---|---|
| Surface No. | r | d | N | ν |
| 1 | −111.215 | 21.59 | 1.63854 | 55.4 |
| 2 | −690.464 | 8.25 | | |
| 3 | −290.180 | 38.00 | 1.48749 | 70.2 |
| 4 | −180.385 | 1.00 | | |
| 5 | 1321.400 | 34.22 | 1.69680 | 55.5 |
| 6 | −217.968 | 37.82 | | |
| 7 | 1103.738 | 26.95 | 1.48749 | 70.2 |
| 8 | −608.753 | 55.80 | | |
| 9 | −218.895 | 13.00 | 1.74000 | 28.3 |
| 10 | −617.952 | 636.49 | | |
| 11 | 1182.039 | 65.96 | 1.51633 | 64.1 |
| 12 | ∞ | 56.18 | | |
| 13 | 1182.039 | 65.96 | 1.51633 | 64.1 |
| 14 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

10. The f.θ lens system of claim 1, further satisfying the following charts:

| $F_{NO} = 1:50.0$  f = 749.92 Entrance pupil located ahead of the first surface 85.00 | | | | |
|---|---|---|---|---|
| Surface No. | r | d | N | ν |
| 1 | −118.307 | 12.20 | 1.63854 | 55.4 |
| 2 | −758.972 | 12.83 | | |
| 3 | −267.384 | 34.29 | 1.48749 | 70.2 |
| 4 | −184.928 | 6.53 | | |
| 5 | 1246.961 | 48.52 | 1.69680 | 55.5 |
| 6 | −219.951 | 44.16 | | |
| 7 | 1221.674 | 31.57 | 1.48749 | 70.2 |
| 8 | −519.997 | 31.41 | | |
| 9 | −226.019 | 14.00 | | 28.3 |

| -continued | | | | |
|---|---|---|---|---|
| $F_{NO} = 1:50.0$  f = 749.92 Entrance pupil located ahead of the first surface 85.00 | | | | |
| Surface No. | r | d | N | ν |
| 10 | −568.064 | 728.50 | | |
| 11 | 875.046 | 89.82 | 1.51633 | 64.1 |
| 12 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

11. The f.θ lens system of claim 1, further satisfying the following charts:

| $F_{NO} = 1:50.0$  f = 750.33 Entrance pupil located ahead of the first surface 85.00 | | | | |
|---|---|---|---|---|
| Surface No. | r | d | N | ν |
| 1 | −110.000 | 12.00 | 1.62299 | 58.2 |
| 2 | −715.309 | 13.93 | | |
| 3 | −290.131 | 42.00 | 1.58913 | 61.0 |
| 4 | −195.187 | 2.01 | | |
| 5 | 1401.966 | 39.76 | 1.48749 | 70.2 |
| 6 | −216.558 | 6.23 | | |
| 7 | 1302.920 | 37.52 | 1.48749 | 70.2 |
| 8 | −340.807 | 100.58 | | |
| 9 | −227.177 | 14.00 | 1.74000 | 28.3 |
| 10 | −445.519 | 680.36 | | |
| 11 | 914.474 | 85.70 | 1.51633 | 64.1 |
| 12 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

12. The f.θ lens system of claim 1, further satisfying the following charts:

| $F_{NO} = 1:50.0$  f = 750.70 Entrance pupil located ahead of the first surface 78.95 | | | | |
|---|---|---|---|---|
| Surface No. | r | d | N | ν |
| 1 | −108.692 | 19.20 | 1.50977 | 62.1 |
| 2 | −3306.621 | 6.80 | | |
| 3 | −601.838 | 33.47 | 1.48749 | 70.2 |
| 4 | −172.232 | 2.00 | | |
| 5 | 3551.572 | 27.79 | 1.80440 | 39.6 |
| 6 | −226.013 | 70.98 | | |
| 7 | −220.019 | 12.00 | 1.80518 | 25.4 |
| 8 | −5930.015 | 26.78 | | |
| 9 | −5458.181 | 34.36 | 1.72916 | 54.7 |
| 10 | −364.192 | 695.12 | | |
| 11 | ∞ | 60.90 | 1.51633 | 64.1 |
| 12 | −1279.349 | 8.00 | | |
| 13 | 1279.349 | 60.90 | 1.51633 | 64.1 |
| 14 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

13. The f.θ lens system of claim 1, further satisfying the following charts:

| | $F_{NO} = 1:50.0$ | $f = 750.51$ | | |
|---|---|---|---|---|
| Entrance pupil located ahead of the first surface 108.00 | | | | |
| Surface No. | r | d | N | ν |
| 1 | −104.848 | 18.01 | 1.51112 | 60.5 |
| 2 | 1227.930 | 38.00 | 1.72342 | 38.0 |
| 3 | −495.112 | 4.55 | | |
| 4 | −568.344 | 40.00 | 1.48749 | 70.2 |
| 5 | −195.633 | 17.17 | | |
| 6 | −953.790 | 13.00 | 1.80518 | 25.4 |
| 7 | 777.368 | 10.59 | | |
| 8 | 948.224 | 51.19 | 1.48749 | 70.2 |
| 9 | −337.320 | 1.50 | | |

-continued

| | $F_{NO} = 1:50.0$ | $f = 750.51$ | | |
|---|---|---|---|---|
| Entrance pupil located ahead of the first surface 108.00 | | | | |
| Surface No. | r | d | N | ν |
| 10 | 2331.561 | 33.29 | 1.69680 | 55.5 |
| 11 | −752.800 | 978.03 | | |
| 12 | ∞ | 50.00 | 1.51633 | 64.1 |
| 13 | −2269.202 | 8.00 | | |
| 14 | 2269.202 | 50.00 | 1.51633 | 64.1 |
| 15 | ∞ | | | | in which $F_{NO}$ signifies the F number, f is the focal length, r is the radius of curvature of an individual lens surface, d is the lens thickness or aerial lens-to-lens distance, N is the refractive index of an individual lens at the d-line, and ν denotes the Abbe number of an individual lens.

* * * * *